Patented Nov. 5, 1940

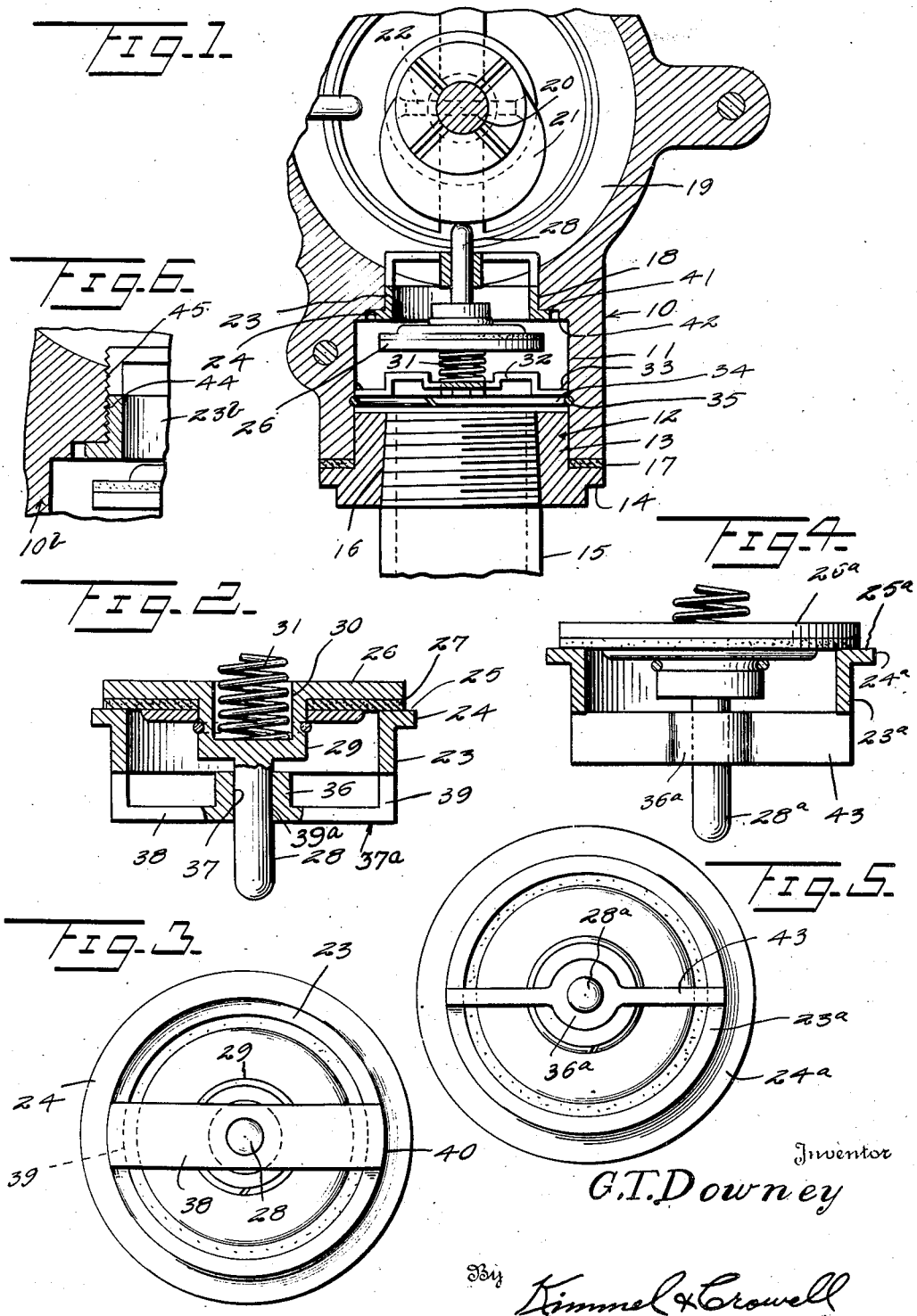

2,220,782

UNITED STATES PATENT OFFICE 2,220,782

VALVE SEAT

George T. Downey, Corry, Pa., assignor to Aero Supply Manufacturing Co., Inc., Corry, Pa.

Application November 17, 1939, Serial No. 305,007

1 Claim. (Cl. 251—167)

This invention relates to valve structures and is a continuation in part of my copending application, Serial No. 284,313, filed July 13, 1939 for Valve assembly.

An object of this invention is to provide in a valve port an improved valve seat and guide which is so constructed that it may be inserted within the port so that the valve seat and guide may be formed of different metal from that of the valve housing.

Another object of this invention is to provide an improved valve seat and valve guide which is substantially cylindrical in configuration and is adapted to be pressed into or otherwise firmly held within a valve port.

A further object of this invention is to provide an insertible valve seat and valve guide wherein one end of the device is formed with a flange limiting the insertion of the seat in a valve port, the flange also forming with the adjacent or outer end of the device a flat seat upon which a poppet valve is adapted to engage.

A still further object of this invention is to provide an insertible valve seat of this kind which is so constructed that it will not unduly impede the flow of the fluid therethrough, the device being formed with an axial valve stem guide and a diametrically disposed supporting bar which may be formed of substantially U-shape with the opposite ends thereof arcuate in transverse section and coacting with the peripheral surface of the seat body to firmly maintain the body within the valve port.

A further object of this invention is to provide a structure of this kind wherein the valve stem guide may be supported by a diametrically disposed supporting bar which is positioned in edgewise relation relative to the flow of the fluid through the device so as to provide the least possible resistance to the flow of the fluid through the device.

To the above objects and to others which may hereinafter appear, the invention consists of the novel construction, combination and arrangement of parts as will be more specifically referred to and illustrated in the accompanying drawing, wherein are shown embodiments of the invention, but it is to be understood that changes, variations and modifications may be resorted to which fall within the scope of the invention as claimed.

In the drawing:

Figure 1 is a fragmentary transverse sectional view of a valve housing having an insertible seat and valve guide mounted in a valve port thereof, Figure 2 is an enlarged fragmentary sectional view partly in elevation of the seat and a valve associated with the seat, Figure 3 is a bottom plan of the device, Figure 4 is a view similar to Figure 2 but showing a slightly modified form of this device, Figure 5 is a detail end elevation of the structure shown in Figure 4, and Figure 6 is a fragmentary sectional view of a modified form of valve seat.

Referring to the drawing and first to Figures 1 to 3 inclusive, the numeral 10 designates generally a valve housing provided with a valve port 11 in which a connector member 12 is mounted. The connector member 12 includes an annular body 13 provided with a flange 14 which is adapted to be secured to the outer end of the port 11 and a pipe 15 is adapted to be threaded into the threaded bore 16 of the connector 12. A gasket 17 may be interposed between the flange 14 and the adjacent end of the housing 10.

The housing 10 is provided with a reduced passage 18 communicating at one end with the valve port 11 and at the other end with a central chamber 19. A shaft 20 is journalled axially of the chamber 19 and a valve operating cam 21 is secured as by a pin or fastening member 22 to the shaft 20.

A substantially cylindrical member or body 23 is disposed in the passage 18 and is provided at its outer end with an annular flange 24 which has the outer face thereof substantially flush with the outer end of the member or body 23. The said outer face of flange 24 is to correlate with the said outer end of said member 23 so as to form a substantially wide flat valve seat 25. The length of the member 23 is less than the length of the passage 18. The member 23 has its inner diameter uniform, its outer diameter uniform and its thickness corresponding to the thickness of the flange 24. The transverse cross section length of flange 24 is greater than the thickness of member 23. A valve head 26 provided on its inner face with a bracket 27 is adapted to engage the seat 25. The valve head 26 is provided with an axial stem 28 having an enlarged portion 29 provided with a socket or recess 30 opening through the head 26. A valve spring 31 engages at one end within the socket 30 and at the other end engages against a spider or spring compressing member 32. The spider 32 engages against a shoulder 33 which is formed within the valve port 11 and a split ring 34 bears against the outer faces of the arms of the spider 32 and engages in an annular groove 35 formed in the housing 10. The ring 34 maintains the arms of the spider 32 on the shoulder 33.

An annular sleeve-like valve stem guide 36 is disposed axially of the body 23 and the valve stem 28 is slidable in the bore 37 of the guide 36. The guide 36 is supported axially of the body 23 by means of a yoke shaped element 37a formed of a bight 38 and a pair of arms 39. The element 37a is of strap-like form and its bight 38 is flat and in transverse section is of rectangular contour. The bight 38 at the intersection of its lengthwise and transverse median is formed with an opening 39a corresponding in diameter to the diameter of the bore 37. The bight 38 is spaced inwardly from the non-flanged end of and has its lengthwise median align with the horizontal diametric center of the member 23. The ends of the bight 38 are of arcuate contour. The arms 39 of element 37a extend from the ends of the front face of the bight 38 and merge into the non-flanged or rear end of the member 23. The width of the arms 39 correspond to the width of the bight 38. The lengthwise centers of the arms 39 align with the horizontal diametric center of the member 23. The inner and outer faces of the arms 39 are flush with the inner and outer faces respectively of the member 23. The arms in transverse section are of arcuate contour as shown at 40, Figure 3. The thickness of the element 37a corresponds to the thickness of the member 23.

The guide 36 at its rear end is integral with the front face of the bight 38 and its diameter is slightly greater than the width of the said bight. The wall of the bore 37 is flush with and forms a continuation of the wall of opening 39a. The guide 36 is of a length to have its front end align with the rear end of member 23.

The length of the element 37a is to be slightly less than the length of the member 23.

The radius of the outer face of each arm 39 is the same as the radius of the outer face of member 23. The latter is of an outer diameter to frictionally engage the wall of passage 18 whereby said member 23 will be secured to the housing 10. The arms 39 also frictionally engage the wall of passage 18 and coact with the member 27 to assist in securing the latter to the housing 10. When member 23 is secured to housing 10 the flange 24 engages in an annular recess 41 provided in the housing 10 bordering passage 18. The depth of recess 41 is such whereby the valve seat 25 provided by member 23 will be flush with the end 42 of the valve part 11.

In Figures 4 and 5, there is disclosed a slightly modified form of valve seat structure. A cylindrical valve body 23a is provided at its outer end with an annular flange 24a similar to the flange 24 and a valve head 26a is adapted to engage against the valve seat 25a which is formed with the outer face of the flange 24a and the outer end of the body 23a. A valve stem 28a is slidable through a boss or valve stem guide 36a which is positioned axially of the cylindrical body 23a. The outer end of the boss 36a is substantially flush with the inner end of the body 23a in the same manner that the outer end of the boss or guide 36 is substantially flush or coplanar with the inner end of the body 23. A supporting bar 43 is formed integral with the guide 36a and is also formed at the opposite ends thereof with the body 23a. The bar 43 is disposed in edgewise relation as shown in Figure 5 so that this bar 43 will provide as little resistance as possible to the flow of a fluid through the interior of the body 23a.

In the use of this combined valve seat and valve guide, the housing 10 is provided with the passage 18 to receive the body 23. This body 23 may be either pressed or screwed into the passage 18 or if desired the body 18 may be subjected to a very low temperature so as to contract the body 23 and thus permit this body to be inserted in the passage 18. After the temperature of the body 23 is normal or above normal, this body will expand and thus tightly engage within the passage 18.

With the construction shown in Figures 2 and 3, the arcuate arms 39 forming part of the U-shaped valve stem guide support may also engage in the passage 18 so as to coact with the peripheral surfaces of the body 23 in tightly holding this body against endwise movement within the passage 18. The flange 24 will engage within the annular recess 41 so that the outer surface thereof will be substantially flush with the inner end 42 of the valve port 11.

In Figure 6 there is shown a further modification of valve seat structure wherein a cylindrical body 23b is provided and which has peripheral threads 44 engaging threads 45 provided in the valve port. The remaining structure shown in Figure 6 is identical with the structure shown in Figures 1, 2 and 3 and the description of these figures will apply equally as well to Figure 6 with the exception of the threads for mounting the valve seat in the housing.

The valve seat hereinbefore described has been designed particularly for use with multiple valve structures used for controlling the flow of liquids or gases and more especially for the flow of gasoline from a source of supply to an internal combustion engine.

With a construction of this kind, the valve seat and guide may be formed of metal which is different from the metal of the housing so that a seat for the valve may be provided which will tightly close the valve port when the valve is engaged on the seat. At the same time in the event the seat should become unduly worn or damaged, the seat may be removed and a new seat inserted in its place.

What I claim is:

As a new article of manufacture, a combined valve seat forming and valve stem guide structure formed of an integral body consisting of an annular forward portion having its outer diameter uniform, its inner diameter uniform, its forward edge flat and provided at the front end of its outer periphery with a laterally disposed flat means aligning and coacting with said flat edge to provide a wide flat annular valve seat, the thickness of said flat means corresponding to the thickness of said annular portion, a yoke-shaped portion arranged rearwardly of said front portion including a flat rectangular bight having its thickness materially less than its transverse cross sectional length and a pair of arms extending forwardly from the front of, disposed at right angles to and having their rear ends merging into the end terminal portions of said bight, said arms merging at their forward ends into diametrically opposed parts of the rear end edge of said annular portion, said arms being of transversely arcuate configuration and corresponding in width and thickness to that of said bight, said bight being provided intermediate its ends with an opening, said annular portion and opening being co-axially arranged, a valve stem guide of sleeve-like form arranged rearwardly of said front portion, of a length corresponding to the length of each arm, having its rear end integral with the front face of said bight and its inner face forming a forward continuation of the wall of said opening, said sleeve having diametrically opposed portions of its outer periphery slightly extended from the lengthwise edges of said bight, and said bight and arms corresponding in thickness to the thickness of said annular portion.

GEORGE T. DOWNEY.